United States Patent
Lucas et al.

(10) Patent No.: US 7,278,444 B2
(45) Date of Patent: Oct. 9, 2007

(54) VALVE ASSEMBLY HAVING IMPROVED PUMP-DOWN PERFORMANCE

(75) Inventors: Paul D. Lucas, Melrose, MA (US); Jaroslaw W. Pisera, Bedford, MA (US)

(73) Assignee: MKS Instruments, Inc., Wilmington, MA (US)

( * ) Notice: Subject to any disclaimer, the term of this patent is extended or adjusted under 35 U.S.C. 154(b) by 178 days.

(21) Appl. No.: 11/063,075

(22) Filed: Feb. 22, 2005

(65) Prior Publication Data

US 2006/0185743 A1    Aug. 24, 2006

(51) Int. Cl.
*F16K 3/30* (2006.01)

(52) U.S. Cl. ............... 137/599.18; 251/117; 251/172; 251/192; 251/251; 251/301

(58) Field of Classification Search ........... 137/599.18; 251/228, 251, 117, 127, 172, 301, 302, 326, 251/327, 192, 193
See application file for complete search history.

(56) References Cited

U.S. PATENT DOCUMENTS

| | | | | |
|---|---|---|---|---|
| 286,656 | A | * 10/1883 | Van Pie ............... | 251/117 |
| 723,974 | A | * 3/1903 | Anderson ............ | 251/117 |
| 2,190,412 | A | * 2/1940 | McMurry ............ | 137/599.18 |
| 2,351,775 | A | * 6/1944 | McMurry ............ | 137/599.18 |
| 2,370,751 | A | 3/1945 | Prager | |
| 2,857,129 | A | * 10/1958 | Overholser et al. ... | 251/172 |
| 3,145,969 | A | 8/1964 | Von Zweck | |
| 3,170,668 | A | 2/1965 | Aulisa | |
| 3,405,911 | A | * 10/1968 | Bolling, Jr. ......... | 251/172 |
| 3,780,982 | A | 12/1973 | Kemp | |

(Continued)

FOREIGN PATENT DOCUMENTS

DE    297 02 565 U1    6/1998

(Continued)

OTHER PUBLICATIONS

Nor-Cal Products, Inc., Intellisys Adaptive Pressure Control, 6 sheets, Yreka, CA.

(Continued)

*Primary Examiner*—Stephen M. Hepperle
(74) *Attorney, Agent, or Firm*—McDermott Will & Emery LLP (57) ABSTRACT

A valve assembly including a housing having a flow path extending to an outlet and a valve seat in the flow path and around the outlet, a slide plate located in the housing and movable transversely to a longitudinal axis of the flow path between a closed position, in which the slide plate is in contact with the valve seat and blocks flow through the flow path, and an opened position, in which the slide plate allows flow through the flow path, and wherein at least one of the slide plate and the valve seat includes at least one passageway for providing a predetermined amount of conductance between the slide plate and the valve seat when the slide plate is in the closed position.

21 Claims, 5 Drawing Sheets

U.S. PATENT DOCUMENTS

| | | | |
|---|---|---|---|
| 4,562,992 A | 1/1986 | Sugisaki et al. | |
| 5,577,707 A | 11/1996 | Brida | |
| 5,873,562 A | 2/1999 | Marugg | |
| 6,089,537 A | 7/2000 | Olmsted | |
| 6,161,576 A | 12/2000 | Maher et al. | |
| 6,328,051 B1 | 12/2001 | Maher | |
| 6,409,149 B1 | 6/2002 | Maher, Jr. | |
| 2004/0164264 A1 | 8/2004 | Lucas | |

FOREIGN PATENT DOCUMENTS

| | | | |
|---|---|---|---|
| DE | 198 07 503 A1 | 8/1999 | |
| EP | 0 189 562 A | 8/1986 | |

OTHER PUBLICATIONS

Vat Vakuumventile AG, Pendulum Valve Control System VAT Series 65, pp. 96-105, Haag, Switzerland.

Vat Vakuumventile AG, Pendulum Valve VAT Series 16, pp. 46-49, Haag, Switzerland.

PCT International Search Report for related PCT Application No. PCT/US2006/004448, 5 pages.

PCT Written Opinion of the International Searching Authority for related PCT Application No. PCT/US2006/004448, 6 pages.

* cited by examiner

VALVE ASSEMBLY HAVING IMPROVED PUMP-DOWN PERFORMANCE

FIELD OF THE DISCLOSURE

The present disclosure relates generally to valve assemblies and, more particularly, to a new and improved valve assembly including a slide plate having passageways that provide pressure relief and improved pump-down performance.

BACKGROUND OF THE DISCLOSURE

A slide or gate valve assembly generally includes a housing defining a flow path extending between an inlet and an outlet. The slide valve assembly can, for example, be connected between a process chamber and a vacuum pump to form a portion of a high purity gas delivery system, such as those used in semiconductor manufacturing or other thin film coating processes performed at very low pressures (high vacuums), e.g., a pressure on the order of one torr or less. In such a case, a flange of the inlet of the valve assembly is secured to the process chamber while a flange of the outlet of the valve assembly is secured to the vacuum pump.

The slide valve assembly includes a slide plate that laterally moves, with respect to an axis of the flow path of the valve assembly, between open and closed positions. In a pendulum-type slide valve assembly, the slide plate is connected to a rotatably shaft by a pivot arm. In a completely opened position the slide plate is moved out of the flow path of the housing so that fluid can freely enter and exit the flow path, while in a closed position the slide plate is moved into close contact with a valve seat or annular surface surrounding the outlet of the valve assembly, so that conductance through the flow path is limited. The movement of the slide plate usually requires rotational (i.e., pivotal or lateral) movement between the completely opened position (i.e., first opened position) and an intermediate position (i.e., second opened position), and then at least some longitudinal (i.e., translational, linear or axial) movement from the intermediate position to the closed position where the slide plate is in close contact with the valve seat of the outlet.

U.S. Pat. No. 6,089,537 to Olmsted, which is assigned to the assignee of the present disclosure and incorporated herein by reference, discloses a pendulum valve assembly that uses a simple rotating cam mechanism that precisely controls the rotational and longitudinal movement of the slide plate between a completely opened position and a completely closed position. The cam mechanism also includes a spring which acts to bias the slide plate away from the valve seat of the outlet.

Some existing pendulum valves further include a seal ring to provide a complete seal (isolation) when the seal ring is independently actuated against the slide plate. U.S. Pat. No. 5,577,707 to Brida, for example, discloses a pendulum-type slide valve including a seal ring that is movable towards and away from the slide plate, when the slide plate is pivoted to a closed position. The seal ring is biased, using a spring or compressed air, against the slide plate when the slide plate is in its closed position, to tightly close the slide plate against the valve seat and to form a seal between the slide plate and the seal ring.

The seal ring typically provides an isolation function for the valve assembly and is not used to control conductance. Normally the seal ring is held stationary and the slide plate is moved to control conductance. However, in co-pending U.S. patent application Ser. No. 10/673,989, filed on Sep. 29, 2003, which is assigned to the assignee of the present disclosure and incorporated herein by reference, a pendulum valve assembly is disclosed that has a seal ring adapted to provide improved conductance control during the initial opening of the valve.

Operation of the valve assembly between the process chamber and the vacuum pump usually includes three stages: isolation, pump-down, and throttling. During isolation, the seal ring provides an isolation function and the pressure differential between the inlet and the outlet of the valve assembly is large. During pump-down, the seal ring is moved away from the slide plate and conductance gradually increases between the slide plate and the valve seat of the outlet, and the pressure differential between the inlet and the outlet of the valve assembly decreases. During throttling, conductance between the slide plate and the valve seat of the outlet is maintained at a constant, predetermined level and the pressure differential between the inlet and the outlet of the valve assembly is relatively low but remains constant. The throttling procedure is used to maintain a desired low pressure (i.e., processing pressure) within the attached process chamber during the processing of semiconductor devices.

One drawback for some existing gate or pendulum valves is that, when a high pressure differential exists between the chamber side and the pump side of the valve, a large force is needed to initially move the slide plate and open the valve. Such a large force requires a large drive mechanism, which adds to the size and cost of the valve assembly. Alternatively, a separate bypass valve may be connected to the chamber side of the pendulum valve and operated to lower the pressure in the chamber side of the pendulum valve prior to opening the pendulum valve, such that a large drive mechanism is not needed to initially move the slide plate. Again, however, a separate bypass valve adds to the size and cost of the pendulum valve assembly.

If a large drive mechanism or a separate bypass valve is not used, then the pump-down procedure may require a long period for conductance to develop between the slide plate and the valve seat of the outlet, and for the pressure differential to drop to a desired level. Long pump-down periods, however, are unwanted in the processing of semiconductor devices since such long periods ultimately reduce the output of processed semiconductor devices.

What is still desired is a new and improve valve assembly. Preferably, the new and improved valve assembly will be adapted such that a high pressure differential between the chamber side (i.e., inlet of valve assembly) and the pump side (i.e., outlet) of the valve assembly is automatically reduced prior to opening of the slide plate, so that a large drive mechanism or a separate bypass valve is not needed to initially move the slide plate and open the valve during a pump-down procedure. In addition, the automatic reduction of the high pressure differential preferably will provide shorter pump-down periods during the processing of semiconductor devices.

SUMMARY OF THE DISCLOSURE

The present disclosure provides a new and improved valve assembly that is adapted to automatically provide a pressure reduction between an inlet and an outlet of the valve assembly prior to opening a slide plate of the valve assembly. A large force, therefore, is not needed to initially move the slide plate and open the valve. Since a large drive force is not necessary, a large drive mechanism, which would add to the size and cost of the valve assembly, is also not necessary. In addition, the automatic reduction of the high pressure differential is not achieved through the use of a separate bypass valve, which would add to the size and cost of the valve assembly. Moreover, the new and improved valve assembly allows relatively rapid pump-down procedures without the use of a large drive mechanism or a separate bypass valve.

According to one exemplary embodiment, the valve assembly includes a housing having a flow path extending to an outlet and a valve seat in the flow path and around the outlet. A slide plate is located in the housing and movable transversely to a longitudinal axis of the flow path between a closed position, in which the slide plate is in contact with the valve seat and blocks flow through the flow path, and an opened position, in which the slide plate allows flow through the flow path. At least one of the slide plate and the valve seat includes at least one passageway for providing a predetermined amount of conductance between the slide plate and the valve seat when the slide plate is in the closed position. The passageway allows a pressure reduction between an inlet and the outlet of the valve assembly prior to moving the slide plate to the opened position during a pump-down procedure.

According to another exemplary embodiment, the flow path of the valve assembly extends from an inlet to the outlet and defines a valve seat in the flow path and around the inlet, and the assembly further includes a seal ring coaxially positioned within the flow path between the valve set of the inlet and the slide plate. The seal ring is axially movable in the flow path towards the slide plate to provide a seal between the slide plate and the valve seat of the inlet.

According to a further exemplary embodiment, at least one of the slide plate and the seal ring includes at least one passageway for increasing conductance between the slide plate and the seal ring during movement of the seal ring.

Additional aspects and advantages of the present disclosure will become readily apparent to those skilled in this art from the following detailed description, wherein exemplary embodiments of the present disclosure are shown and described, simply by way of illustration of the best modes contemplated for carrying out the present disclosure. As will be realized, the present disclosure is capable of other and different embodiments and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

Reference is made to the attached drawings, wherein elements having the same reference character designations represent like elements throughout, and wherein.

DETAILED DESCRIPTION OF EXEMPLARY EMBODIMENTS

Figure 1:
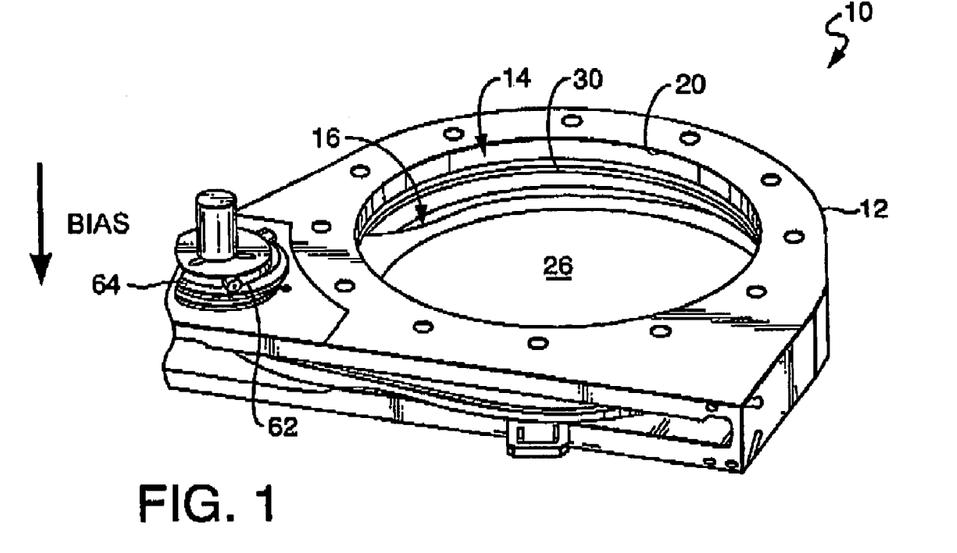
FIG. 1 is a bottom perspective view of a portion of an exemplary embodiment of a valve assembly constructed in accordance with the present disclosure, showing a slide plate and a seal ring of the valve assembly.
Figure 2:
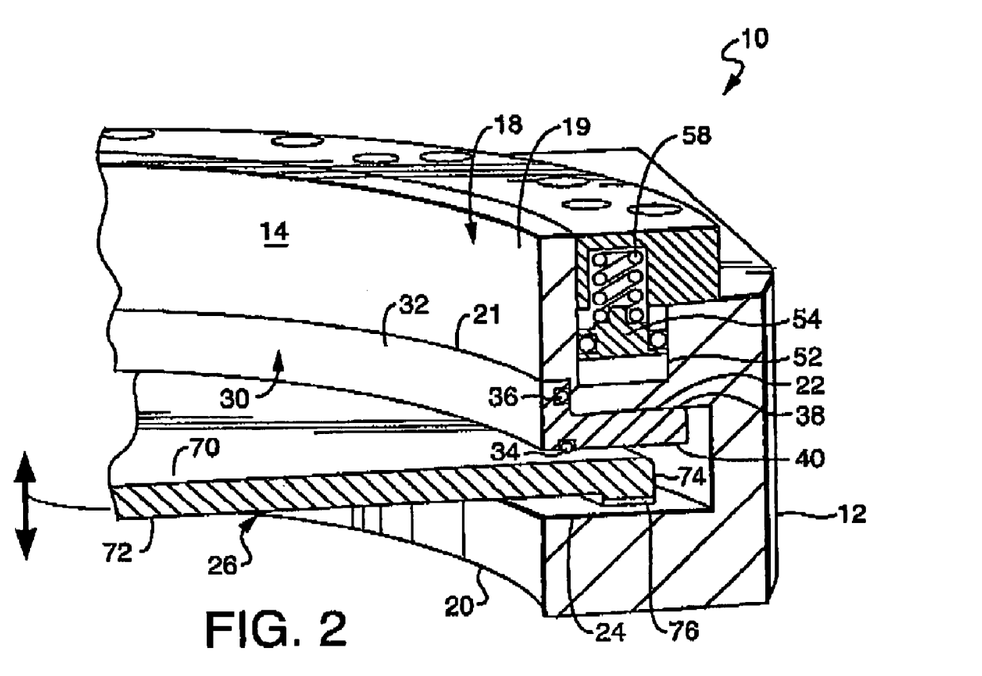
FIG. 2 is an enlarged top perspective view, in section, of a portion of the valve assembly of FIG. 1, showing the slide plate of the valve assembly in a partially opened position spaced from a valve seat of an outlet of the valve assembly, and with the seal ring biased away from the slide plate.

Referring to FIGS. 1 and 2, an exemplary embodiment of a pendulum valve assembly 10 constructed in accordance with the present disclosure generally includes a housing 12 defining a flow path 14 extending between an inlet 18 and an outlet 20. Valve seats 22, 24 are provided in the flow path 14 of the housing 12 around edges of the openings 18, 20. As shown, the assembly includes a pendulum valve 16 operatively mounted within the housing and having a slide plate 26 which is pivotally movable between a first opened position completely out of the flow path 14, and a second opened position, which is inside the flow path 14, as shown in FIG. 2. The slide plate 26 allows reduced fluid flow through the outlet 20 when in the second opened position inside the flow path 14. The slide plate 26 is further axially movable from the second opened position inside the flow path 14 to a minimum controllable conductance position against the valve seat 24 of the outlet 20, substantially preventing fluid flow through the outlet 20 (i.e., a substantially closed position). In this substantially closed position the plate 26 may or may not physically contact the valve seat 24 of the outlet 20, and there may be a small gap.

Although not shown, the inlet 18 of the pendulum valve assembly 10 can, for example, be connected to a process chamber and the outlet 20 can be connected to a vacuum pump to form a portion of a high purity gas delivery system, such as those used in semiconductor manufacturing or other thin film coating processes performed at very low pressures (high vacuums), such as a pressure on the order of one torr or less. In general, a work piece, such a semiconductor wafer, is placed in the chamber, while a process gas is introduced into the chamber to chemically react with the work piece in a predetermined manner.

The pendulum valve assembly 10 helps control the conductance between the process chamber and the vacuum pump by controlling the position of the slide plate 26 between the first opened position, located completely out of the flow path 14, the second opened position, located inside the flow path 14, as shown in FIG. 2, and the substantially closed position against the valve seat 24 of the outlet 20. The pendulum valve assembly 10 can thereby be used to control the pressure within the process chamber by controlling the conductance. It should be noted that the distance between the process chamber and the vacuum pump is preferably made as small as possible, such that, the pendulum valve assembly 10 is provided with a smallest dimension between the inlet 18 and the outlet 20 (i.e., "flange-to-flange dimension").

Still referring to FIGS. 1 and 2, the valve assembly 10 further includes a seal ring 30, which coaxially surrounds the flow path 14 and is positioned in the inlet 18 of the housing 12 and between the slide plate 26 and the valve seat 22 of the inlet 18. As shown best in FIG. 2, the seal ring 30, has a first surface 38 facing towards the inlet 18, and a second surface 40 facing towards the outlet 20 and the slide plate 26, and a nipple 32 extending from the first surface 38 into the inlet 18. A shoulder 21 is provided between an inner surface 19 of the inlet 18 and the valve seat 22 of the inlet 18 for receiving the nipple 32. In the exemplary embodiment shown, the seal ring 30 supports two o-rings 34, 36 formed of an elastomeric material and located in respective grooves formed in the seal ring 30. One o-ring 34 is positioned in a groove of the second surface, between the seal ring 30 and the slide plate 26, while the other o-ring 36 is positioned in a groove of the nipple 32, between the nipple 32 and the shoulder of the inlet 18.

Although not shown, the seal ring 30 has on the first surface 38 remote from the slide plate 26, a plurality of successive, circumferentially arranged bores. The bores are aligned, respectively, with holes formed in the valve seat 22. The holes in the valve seat 22 extend to an annular chamber 52 which coaxially surrounds the flow path 14. A plurality of fasteners, not shown, extend through the holes of the valve seat 22 and are secured in the corresponding bores of the seal ring 30. An annular piston 54 equipped with o-rings is located in the channel 52 and is secured to the fasteners. The chamber 52 includes an inlet conduit so arranged relative to the piston 54 that the fluid, such as compressed air, flowing therethrough acts only on a first side of the piston 54 secured to the fasteners. There are further provided a plurality of springs 58 which act on an opposite side of the annular piston 54 remote from the fasteners (alternatively, two inlet conduits opening into the annular chamber 52 can be provided so that fluid pressure would act on opposite sides of the annular piston 54, to thereby eliminate the springs). An example of such an arrangement is described in greater detail in U.S. patent application Ser. No. 10/369,952, filed on Feb. 20, 2003, now U.S. Patent Application Publication No. US 2004/0164264A1, and entitled Seal Ring for Pendulum Valve Assembly, which is assigned to the assignee of the present disclosure and incorporated herein by reference.

When the slide plate 26 is pivoted into the flow path 14, but remains in an opened position as shown in FIG. 2, the seal ring 30 remains positioned against the valve seat 22 of the inlet 18. In this position of the seal ring 30, a pressure medium flows into the annular chamber 52 so that the annular piston 54 is displaced, against the biasing force of the springs 58 together with the seal ring 30. When the slide plate 26 is in its minimum controllable conductance, or "soft" closed, position against (or very near) the valve seat 24, the seal ring 30 remains positioned against the valve seat 22. However, to completely seal the closed slide plate 26, the pressure fluid is evacuated from the annular chamber 52, so that the springs 58 can push the annular piston 54, together with the attached fasteners 60 and the sealing ring 30 against the slide plate 30, which is forced against the valve seat 24 to provide a "hard" closed position. The closed slide plate 26 is completely sealed by the seal ring 30 to provide an isolation function, wherein a pressure differential between the inlet 18 and the outlet 20 of the valve assembly is largest.

The opening of the slide plate 26 is effected in reverse. Pressure fluid is supplied into the annular chamber 52 so that the annular piston 54 moves together with the fasteners away from the slide plate 26, moving the seal ring 30 away from the slide plate 26. Then, during a pump-down procedure, conductance gradually increases between the slide plate 26 and the valve seat 24 of the outlet 20, and the pressure differential between the inlet 18 and the outlet 20 of the valve assembly decreases. During a throttling procedure, the conductance between the slide plate 26 and the valve seat 24 of the outlet 20 is maintained at a predetermined level and the pressure differential between the inlet and the outlet of the valve assembly is relatively low but remains constant. The throttling procedure is used to maintain a desired pressure (i.e., processing pressure) within an attached process chamber during the processing of semiconductor devices.

As shown in FIG. 1, the assembly 10 can include a rotating cam mechanism 62 that precisely controls the rotational and longitudinal movement of the slide plate 26 between a completely opened position and a completely closed position. An example of a suitable rotating cam mechanism is shown in U.S. Pat. No. 6,089,537, which is assigned to the assignee of the present disclosure and has been incorporated herein by reference. The rotating cam mechanism 62 beneficially provides fine conductance control near the closed position of the slide plate 26. The rotating cam mechanism 62 includes at least one spring 64 which normally biases the slide plate 26 away from the valve seat 24 of the outlet 20. During the pump-down procedure, the spring 64 provides a force which eventually overcomes the inlet-side pressure, as the inlet-side pressure drops, and causes the slide plate 26 to move away from the valve seat 24 of the outlet 20.

Figure 3:
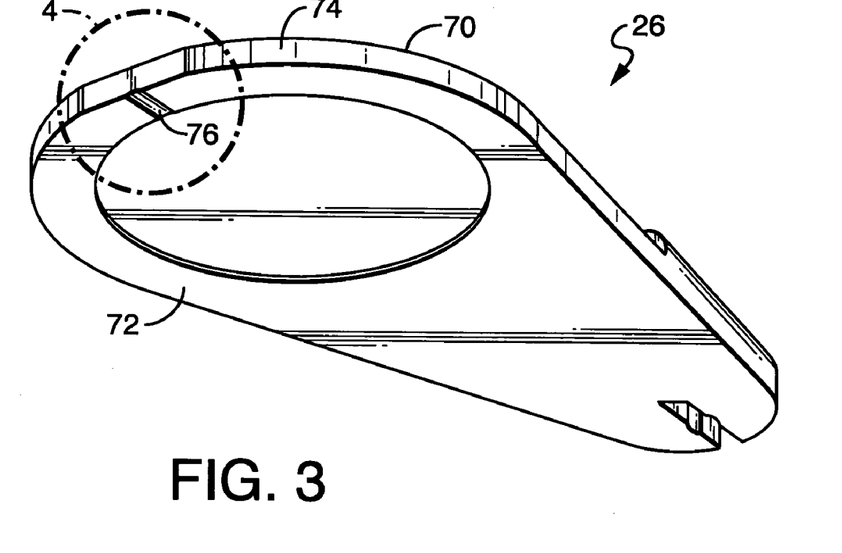
FIG. 3 is a bottom perspective view of the slide plate of the pendulum valve assembly of FIG. 1.
Figure 4:
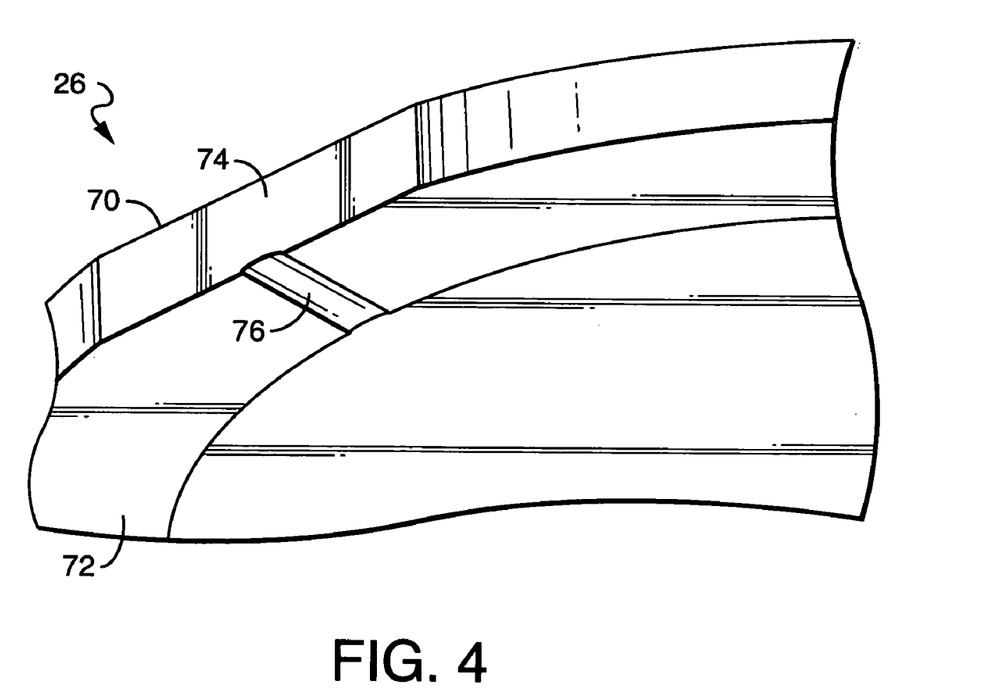
FIG. 4 is an enlarged bottom perspective view of a portion of the slide plate contained in circle "4" of FIG. 3.

Referring now to FIGS. 2 through 4, the slide plate 26 has a first surface 70 facing away from the outlet 20, and a second surface 72 facing towards the outlet, and a radially outwardly facing side wall 74 extending generally parallel with the flow path 14. At least one of the slide plate 26 and the valve seat 24 of the outlet 20 includes at least one passageway 76 for providing a predetermined amount of conductance between the slide plate 26 and the valve seat 24 when the slide plate 26 is in the closed position.

In the exemplary embodiment shown in FIG. 2 through 4, a single passageway 76 is provided in the slide plate 26. Alternatively, however, a passageway can be provided in the valve seat 24 of the outlet 20, or in both of the valve seat 24 of the outlet 20 and the slide plate 26.

The passageway 76 provides an automatic pressure reduction between the inlet 18 and the outlet 20 of the valve assembly 10, after the seal ring 30 has been moved away from the slide plate 26, and prior to the slide plate 26 being pushed away from the valve seat 24 of the outlet 20 by the force of the spring 64 of the rotating cam mechanism 62. A large force, therefore, is not needed to initially move the slide plate 26 away from the outlet 20. Since a large drive force is not necessary, a large drive mechanism, which would add to the size and cost of the valve assembly 10, is also not necessary. In addition, the automatic reduction of the high pressure differential is not achieved through the use of a separate bypass valve, which would add to the size and cost of the valve assembly 10. Moreover, the new and improved valve assembly 10 allows relatively rapid pump-down procedures without the use of a large drive mechanism or a separate bypass valve.

In the exemplary embodiment shown in FIG. 2 through 4, the single passageway comprises a groove 76 formed in the second surface 72 and extending to the side wall 74 of the slide plate 26. The groove 76, which is relatively small, is used with smaller process chambers (e.g., less than 100 liters).

Figure 5:
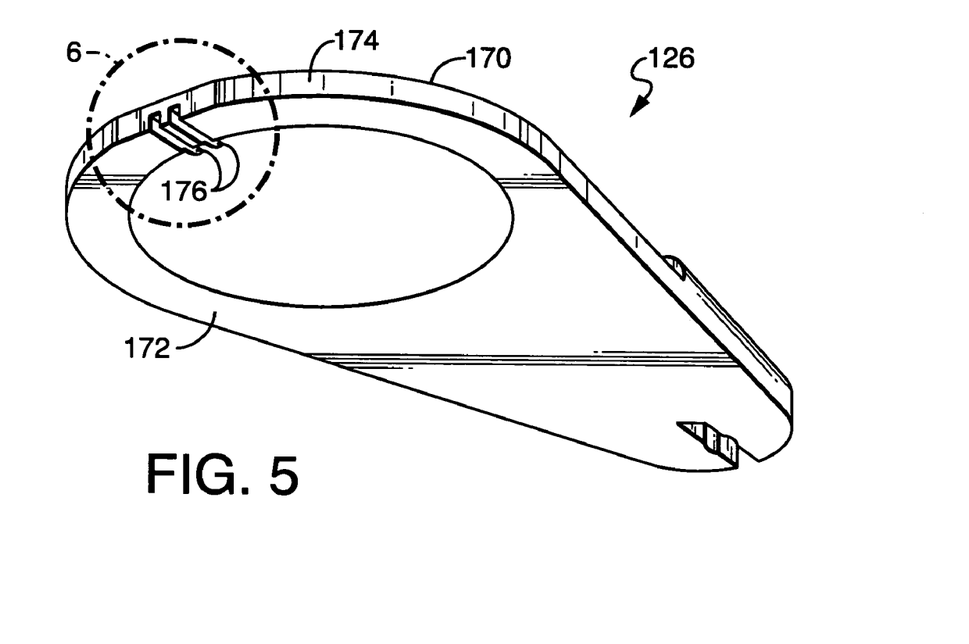
FIG. 5 is a bottom perspective view of another exemplary embodiment of a slide plate constructed in accordance with the present disclosure, for use with the pendulum valve assembly of FIG. 1.
Figure 6:
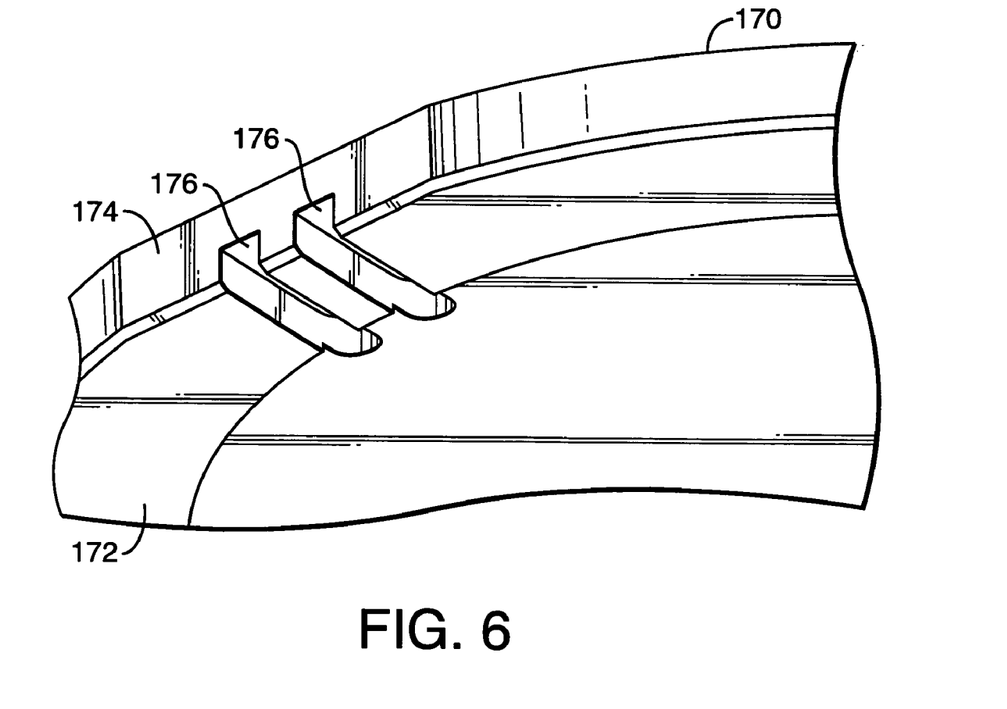
FIG. 6 is an enlarged bottom perspective view of a portion of the slide plate contained in circle "6" of FIG. 5.

FIGS. 5 and 6 show an additional exemplary embodiment of a slide plate 126 constructed in accordance with the present disclosure, for use with the pendulum valve assembly 10 of FIG. 1. The slide plate 126 is similar to the slide plate 26 of FIGS. 1 through 4, such that similar elements have the same reference numeral preceded by a "1". The slide plate 126 of FIGS. 5 and 6 includes multiple passageways 176. In the exemplary embodiment shown, the passageways each comprises a groove 176 formed in the second surface 172 and extending to the side wall 174 of the slide plate 126. The grooves 176, which are relatively large, is used with larger process chambers (e.g., more than 500 liters) and provide a shorter pump-down period. For example, a pump-down period using the embodiment of FIGS. 5 and 6 lasts about 10 minutes for a 1,700 liter chamber, while a pump-down period using the embodiment of FIGS. 1 through 4 lasts about 200 minutes for a 1,700 liter chamber.

Figure 7:
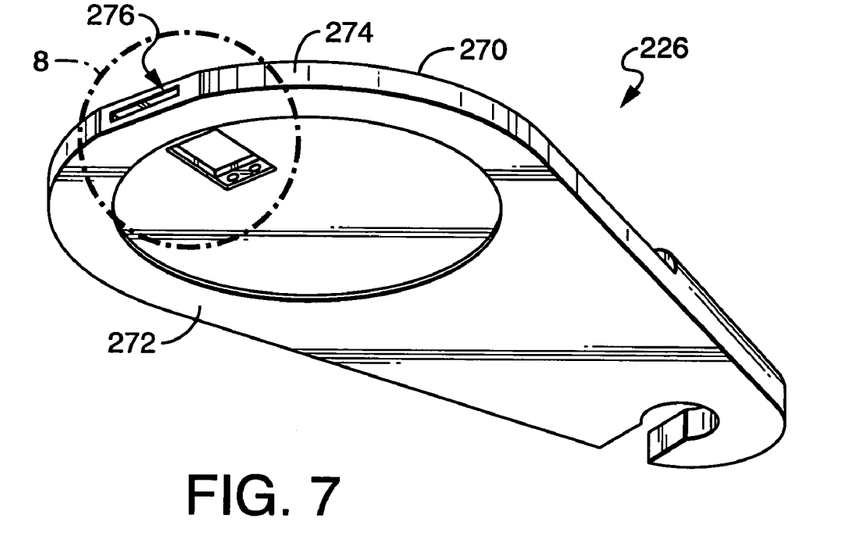
FIG. 7 is a bottom perspective view of an additional exemplary embodiment of a slide plate constructed in accordance with the present disclosure, for use with the pendulum valve assembly of FIG. 1.
Figure 8:
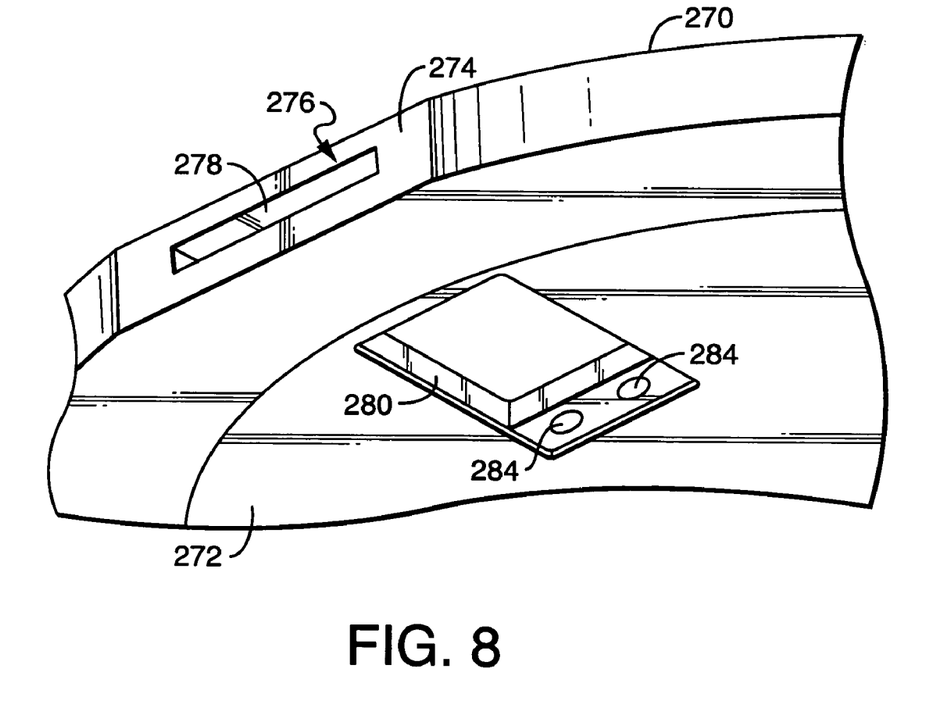
FIG. 8 is an enlarged bottom perspective view of a portion of the slide plate contained in circle "8" of FIG. 7.
Figure 9:
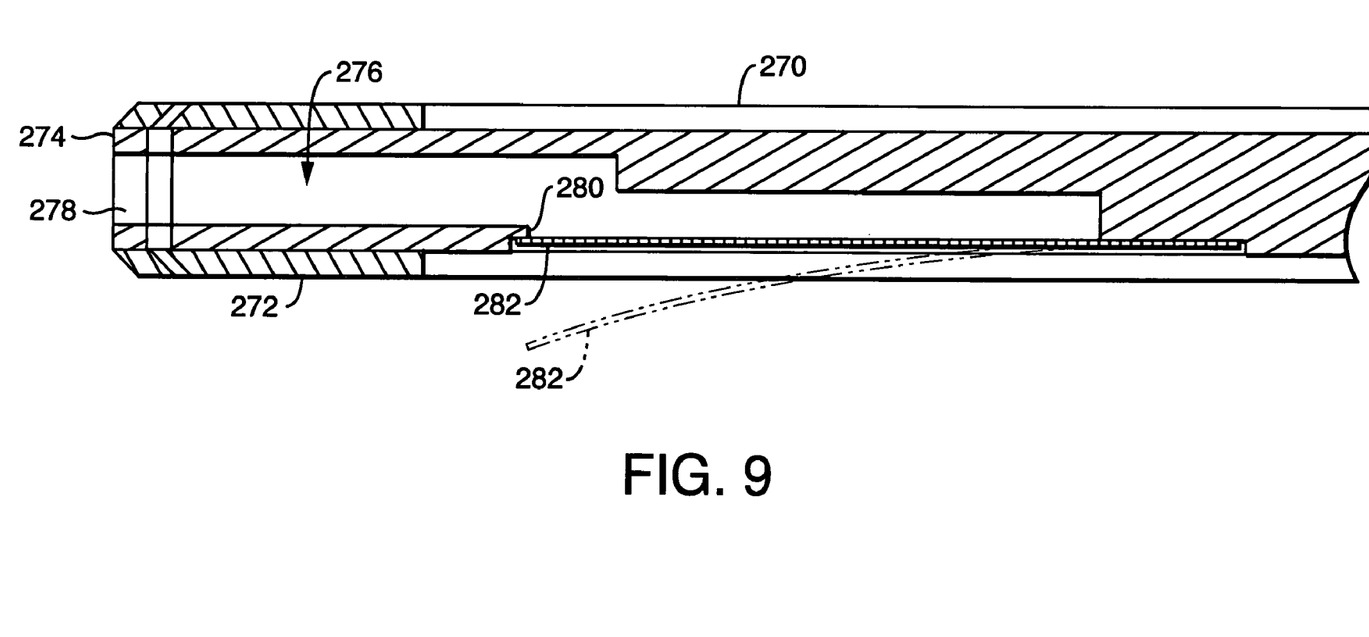
FIG. 9 is an enlarged sectional view of a portion of the slide plate contained in circle "8" of FIG. 7, wherein a door of the slide plate is shown in an opened and closed position.

FIGS. 7 through 9 show a further exemplary embodiment of a slide plate 226 constructed in accordance with the present disclosure, for use with the pendulum valve assembly 10 of FIG. 1. The slide plate 226 is similar to the slide plate 26 of FIGS. 1 through 4, such that similar elements have the same reference numeral preceded by a "2". The slide plate 226 of FIGS. 7 through 9 includes a single passageway 276. The passageway comprises a bore 276 extending from the second surface 272 to the side wall 274 of the slide plate 226, and an entrance 278 of the bore 276 is defined in the side wall 274 while an exit 280 of the bore 276 is defined in the second surface 272. As shown best in FIG. 9, a movable door 282 is positioned over the exit 280 of the bore 276, and is adapted to open when the pressure differential between opposite sides of the slide plate 226 is sufficiently high. In the exemplary embodiment shown, the movable door comprises a resiliently flexible spring plate 282 normally biased closed. The spring plate 282 extends over the exit 280 of the bore 276 and is secured to the slide plate 226 with screws, for example. Screw holes 284 are shown in FIG. 8.

The slide plate 226 of FIGS. 7 through 9 combines the benefits of the slide plate 26 of FIGS. 1 through 4 and the benefits of the slide plate 126 of FIGS. 5 and 6. That is, the slide plate 226 of FIGS. 7 through 9 provides a small effect on the closed conductance during normal operating mode, just as the embodiment 26 of FIGS. 1 through 4 does, and provides a high conductance during pump down, just as the embodiment 126 of FIGS. 5 and 6 does.

Although not shown, the new and improved pendulum valve assembly 10 constructed in accordance with the present disclosure can further include at least one passageway in one of the first surface 70 of the slide plate 26 and the seal ring 30 for increasing conductance between the slide plate and the seal ring during movement of the seal ring. Embodiments of such a passageway, which allows the seal ring 30 to provide improved conductance control during movement of the seal ring 30, are disclosed in co-pending U.S. patent application Ser. No. 10/673,989, filed on Sep. 29, 2003, which is assigned to the assignee of the present disclosure and has been incorporated herein by reference.

Thus, a new and improved pendulum valve assembly 10 constructed in accordance with the present disclosure has been described. The exemplary embodiments described in this specification have been presented by way of illustration rather than limitation, and various modifications, combinations and substitutions may be effected by those skilled in the art without departure either in spirit or scope from this disclosure in its broader aspects and as set forth in the appended claims. For example, the disclosure is not limited to pendulum-type slide valves, and is also applicable to a linear displaceable slide plate or gate valve.

The valve assembly 10 of the present disclosure as disclosed herein, and all elements thereof, are contained within the scope of at least one of the following claims. No elements of the presently disclosed valve assembly are meant to be disclaimed.

What is claimed is:

1. A valve assembly comprising:
 a housing having a flow path extending to an outlet and defining a valve seat in the flow path and around the outlet;
 a slide plate located in the housing and movable transversely to a longitudinal axis of the flow path between a closed position, in which the slide plate is in contact with the valve seat and blocks flow through the flow path, and an opened position, in which the slide plate allows flow through the flow path, wherein the slide plate is pivotally movable into the flow path; and
 wherein at least one of the slide plate and the valve seat includes at least one passageway for providing a predetermined amount of conductance between the slide plate and the valve seat when the slide plate is in the closed position.

2. A valve assembly according to claim 1, wherein the passageway for providing the predetermined amount of conductance between the slide plate and the valve seat is defined in the slide plate.

3. A valve assembly according to claim 2, wherein the slide plate has a first surface facing away from the outlet, a second surface facing towards the outlet, and a radially outwardly facing side wall extending generally parallel with the flow path, and wherein the passageway for providing the predetermined amount of conductance between the slide plate and a seal ring is defined in the second surface and the side wall of the slide plate.

4. A valve assembly according to claim 3, wherein the passageway comprises a groove formed in the second surface and extending to the side wall of the slide plate.

5. A valve assembly according to claim 3, wherein the passageway comprises multiple grooves formed in the second surface and extending to the side wall of the slide plate.

6. A valve assembly according to claim 3, wherein the passageway comprises a bore extending from the second surface to the side wall of the slide plate, and wherein an entrance of the bore is defined in the side wall while an exit of the bore is defined in the second surface.

7. A valve assembly according to claim 6, further comprising a movable door positioned over the exit of the bore.

8. A valve assembly according to claim 7, wherein the movable door is biased closed.

9. A valve assembly according to claim 8, wherein the movable door comprises a resiliently flexible spring plate normally biased closed.

10. A valve assembly according to claim 1, wherein the slide plate is pivotally movable between a first opened position out of the flow path, and a second opened position where the slide plate is pivoted into the slide channel but axially spaced from the valve seat of the outlet, and then axially movable in the flow path to the substantially closed position in contact with the valve seat of the outlet.

11. A valve assembly according to claim 10, further comprising a shaft connected to the slide plate through an arm extending laterally from the shaft, the shaft at least partially mounted within the housing to rotate about a longitudinal axis of the shaft to allow the slide plate to rotate into the flow pat to the second opened position, and also slide substantially parallel to the axis of the flow path to allow the slide plate to move axially in the flow path to the substantially closed position in contact with the valve seat of the outlet.

12. A valve assembly according to claim 11, further including a cam mechanism coupled between the shaft and the housing to provide a combination of rotational movement and sliding movement of the shaft.

13. A valve assembly according to claim 12, wherein the cam mechanism comprises:
   a cam surface defined by the housing; and
   a cam follower fixed to the shaft and engaging the cam surface of the housing.

14. A valve assembly according to claim 12, wherein the cam mechanism comprises a spring for providing sliding movement of the shaft and for normally biasing the slide plate away from the valve seat of the outlet.

15. A valve assembly according to claim 1, wherein the flow path extends from an inlet to the outlet and defines a valve seat in the flow path and around the inlet, and the assembly further comprises a seal ring coaxially positioned within the flow path between the valve set of the inlet and the slide plate, wherein the seal ring is axially movable in the flow path towards the slide plate to provide a seal between the slide plate and the valve seat of the inlet.

16. A valve assembly according to claim 15, wherein at least one of the slide plate and the seal ring includes at least one passageway for increasing conductance between the slide plate and the seal ring.

17. A valve assembly according to claim 16, wherein the at least one passageway for increasing conductance between the seal ring and the slide plate is formed in the seal ring.

18. A valve assembly according to claim 1, further comprising a spring normally biasing the slide plate away from the valve seat of the outlet.

19. A high purity gas delivery system including a valve assembly according to claim 1, and further including a process chamber connected to a vacuum pump through the valve assembly.

20. A valve assembly according to claim 1, wherein the passageway for providing the predetermined amount of conductance between the slide plate and the valve seat is defined in the valve seat.

21. A valve assembly according to claim 1, wherein a passageway for providing the predetermined amount of conductance between the slide plate and the valve seat is defined in both the slide plate and the valve seat.

* * * * *

UNITED STATES PATENT AND TRADEMARK OFFICE
CERTIFICATE OF CORRECTION

PATENT NO. : 7,278,444 B2  Page 1 of 1
APPLICATION NO. : 11/063075
DATED : October 9, 2007
INVENTOR(S) : Paul D. Lucas and Jaroslaw W. Pisera It is certified that error appears in the above-identified patent and that said Letters Patent is hereby corrected as shown below:

IN THE CLAIMS:

Column 9, line 1, delete "pat" and replace with "path".
Column 9, line 23, delete "set" and replace with "seat".

Signed and Sealed this

Sixth Day of January, 2009

JON W. DUDAS
*Director of the United States Patent and Trademark Office*